United States Patent [19]

Yanase et al.

[11] Patent Number: 4,771,312
[45] Date of Patent: Sep. 13, 1988

[54] IMAGE FORMING APPARATUS HAVING A BATTERY

[75] Inventors: Masao Yanase, Kawasaki; Yoshiaki Takayanagi, Yokohama, both of Japan

[73] Assignee: Canon Kabushiki Kaisha, Tokyo, Japan

[21] Appl. No.: 828,185

[22] Filed: Feb. 11, 1986

[30] Foreign Application Priority Data

| Feb. 15, 1985 | [JP] | Japan | 60-026548 |
| Mar. 6, 1985 | [JP] | Japan | 60-042785 |
| Mar. 8, 1985 | [JP] | Japan | 60-044750 |
| Mar. 11, 1985 | [JP] | Japan | 60-046352 |
| Mar. 11, 1985 | [JP] | Japan | 60-046353 |
| Mar. 11, 1985 | [JP] | Japan | 60-046354 |
| Mar. 11, 1985 | [JP] | Japan | 60-046355 |
| Mar. 11, 1985 | [JP] | Japan | 60-046356 |

[51] Int. Cl.$^4$ .................. G03G 13/00; G03B 27/72
[52] U.S. Cl. .................. 355/3 R; 355/14 R; 355/69; 355/77; 307/66
[58] Field of Search .......... 355/3 R, 14 R, 69, 77, 355/14 C, 14 E; 307/46, 49, 86, 66; 363/20, 60

[56] References Cited

U.S. PATENT DOCUMENTS

| 3,387,141 | 6/1968 | Howald | 307/49 |
| 3,784,892 | 1/1974 | Zelina | 307/46 X |
| 4,028,596 | 6/1977 | Weber | 363/20 |
| 4,060,709 | 11/1977 | Hanson | 307/86 X |
| 4,504,134 | 3/1985 | Nozaki et al. | 355/69 |

FOREIGN PATENT DOCUMENTS 3225867 2/1983 Fed. Rep. of Germany .

Primary Examiner—L. T. Hix
Assistant Examiner—D. Rutledge
Attorney, Agent, or Firm—Fitzpatrick, Cella, Harper and Scinto

[57] ABSTRACT

An image forming apparatus such as a copying apparatus comprises: image forming means; a chargeable secondary battery to supply an electric power to the image forming means; a detector to detect a voltage of the battery; and a DC power supply to supply an electric power to the image forming means. The DC power supply is obtained by rectifying and smoothing an AC voltage of an AC power supply. A supply voltage to the image forming means from the battery is controlled in accordance with the presence or absence of the AC power supply. When the battery voltage drops to a value below a predetermined value, the voltage drop is informed to the operator by an indicator and the image forming operation is completed and then stopped. When the AC power supply is used, the discharge current from the battery and the current from the DC power supply are synthesized and this synthetic current is supplied to the image forming means during the image forming operation. When the image forming means is in the inoperative mode, only the current from the DC power supply is supplied to the image forming means.

30 Claims, 21 Drawing Sheets

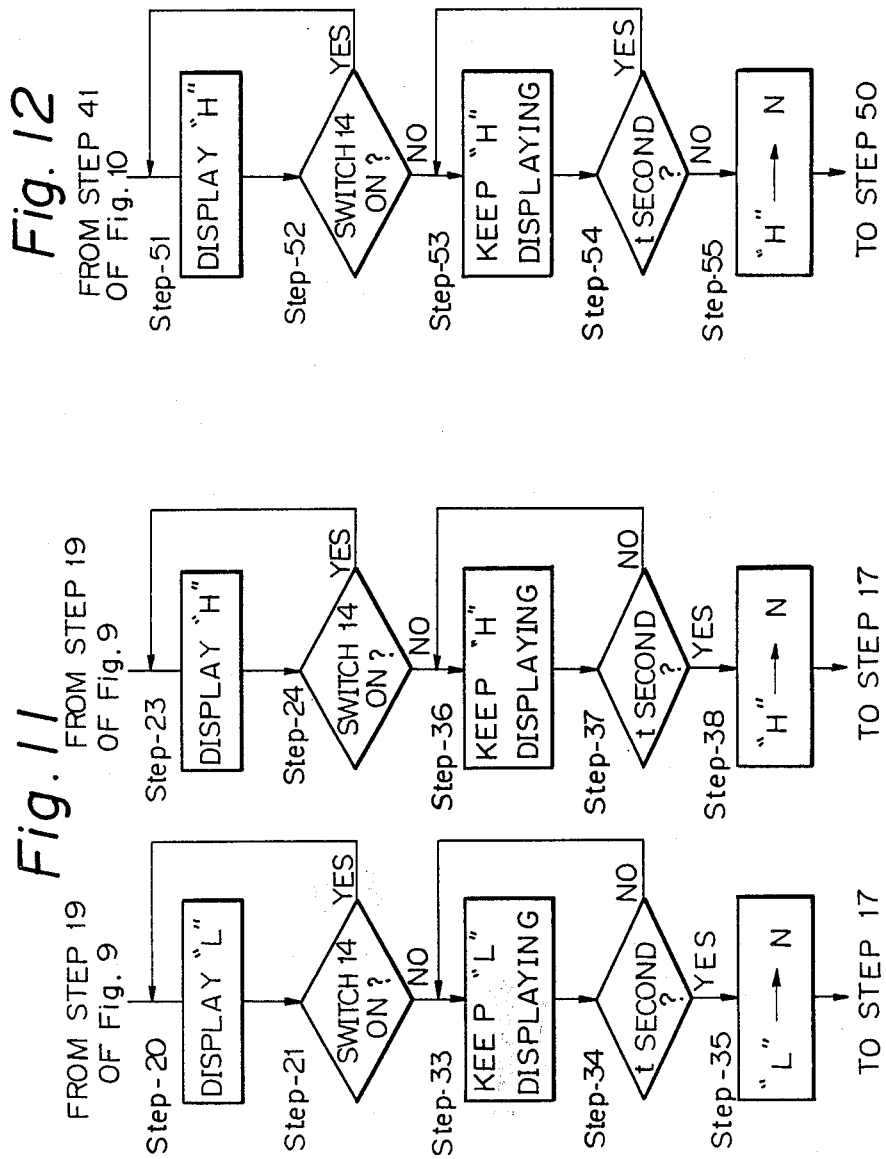

IMAGE FORMING APPARATUS HAVING A BATTERY

BACKGROUND OF THE INVENTION

1. Field of the Invention

The present invention relates to an image forming apparatus having a battery.

2. Description of the Prior Art

Although conventional copying apparatuses use an AC power source, a portable copying apparatus has recently been proposed for the purposes of miniaturization and personalization and a battery is used as a power source of this apparatus.

However, as the battery deteriorates, the voltage decreases and the apparatus cannot be driven, and it is difficult for the user to predict this occurrence. Thus, there is a drawback such that a apparatus is stopped during the copying operation or a miscopy is produced. In addition, since the amount of residual power source of the battery cannot be preliminarily detected, there is an inconvenience such that the battery cannot be exchanged with a new battery at a proper time.

On the other hand, in conventional image forming apparatuses, for example, copying apparatuses or the like, an electronic circuit of a series regulator CR as shown in FIG. 1 or a switching regulator SR as shown in FIG. 2 is used as a power supply of such an apparatus. However, it is obvious that the power supply by way of such an electronic circuit cannot be used at the location where the AC power supply cannot be obtained. In addition, the field of the apparatuses for personal use among the copying apparatuses has recently remarkably been developed and the reduction in size and weight of the copying apparatus has been gradually realized. An electrical arrangement as shown in, e.g., FIG. 3 is used as a conventional electrical arrangement of the small-sized copying apparatus. The arrangement will be practically explained hereinbelow. In FIG. 3, P denotes a power plug; NF is a noise filter; S a door switch; M a main motor; LA a halogen lamp of a light source to expose an original; Ul a lamp regulator to control a lighting voltage of the lamp LA; FM a fan motor to absorb the exhaust heat in the apparatus and ozone; H a fixing heater; Q a triode AC switch to switch a current supply to the heater H; DCP a DC power supply; Ua an AC driving element unit to control AC loads of the main motor, lamp LA, and the like; Us an operation unit through which the operator inputs a copying mode or the like; Uc a DC control unit to discriminate the input information from the operator and perform a sequence control of the copying operation; and Vdc a DC power source voltage.

However, the copying apparatus according to the conventional system as mentioned above has a problem such that it is not fitted to the copying apparatus of the battery driving type to which the present invention is embodied since electric power consumptions of the halogen heater H and halogen lamp LA are large.

SUMMARY OF THE INVENTION

It is an object of the present invention to eliminate the above-mentioned drawback.

Another object of the invention is to provide an image forming apparatus which can know a proper exchange time of a battery by detecting the state of a voltage of the battery.

Still another object of the invention is to provide an image forming apparatus which can form an image when an AC power source is used, and even when the AC power source cannot be used.

Still another object of the invention is to provide an image forming apparatus which can effectively use a battery by controlling a charge current or a charge voltage to a battery in accordance with the situation.

Still another object of the invention is to provide, an image forming apparatus which prevents the needless consumption of a battery and promptly indicates the short-circuit of a load to the operator.

The above and other objects and features of the present invention will become apparent from the following detailed description and the appended claims with reference to the accompanying drawings.

BRIEF DESCRIPTION OF THE DRAWINGS

FIG. 11 is a flowchart showing a control of a delay display which is added to the flowchart of FIG. 9;

FIG. 12 is a flowchart showing a control of a delay display which is added to the flowchart of FIG. 10;

FIG. 18-II is a graph showing the discharge characteristic of a capacitor;

DETAILED DESCRIPTION OF PREFERRED EMBODIMENTS

An embodiment of the present invention will now be described hereinbelow with reference to the drawings.

Figure 4:
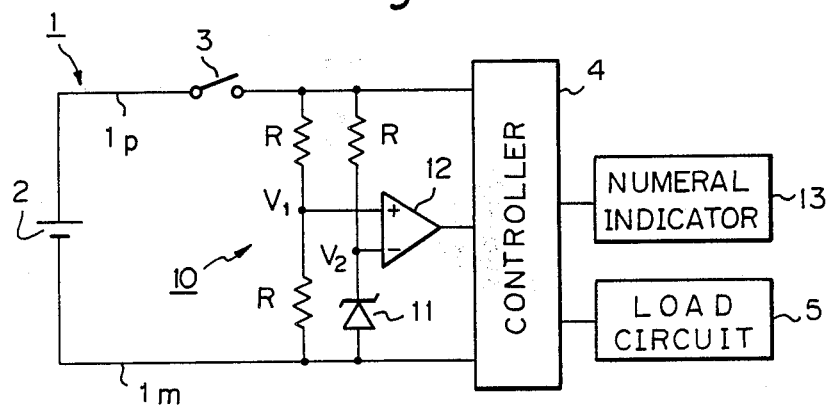
FIG. 4 is a fundamental circuit diagram of an embodiment of the present invention.

FIG. 4 is a diagram showing a fundamental circuit of one embodiment of the invention. A power supply circuit 1 has a conducting wire 1p on the positive (+) side and a conducting wire 1m on the negative (−) side. The wire 1p is led from the positive (+) polarity of a battery 2 to a sequence controller 4 through a main switch 3. The wire 1 m is led from the controller 4 to the negative (−) polarity of the battery 2. A load circuit 5 is connected to the controller 4.

A voltage detecting circuit 10 comprises a plurality of resistors R which are respectively arranged at desired positions, a Zener diode 11, and a comparator 12. The voltage detecting circuit 10 is connected in parallel with the sequence controller 4 and is arranged between the conducting wires 1p and 1m on the (+) and (−) sides which connect the main switch 3 and controller 4 as shown in the diagram. An output of the voltage detecting circuit 10 is inputted to the controller 4 from the output side of the comparator 12. A numeral indicator 13 which indicates numeral N representing the number of copies which have not been executed is connected to the controller 4.

With the above arrangement, the voltage of the battery 2 is always monitored by the comparator 12 when the main switch 3 is ON. The circuit of FIG. 4 is constituted such that when the voltage of the battery is insufficient, the voltage $V_1$ which is applied to the (+) side of the comparator 12 is larger than the voltage $V_2$ which is applied to the (−) side and the output of the comparator 12 is at a high level. However, when the voltage of the battery 2 decreases to a predetermined level, $V_1$ becomes smaller than $V_2$ since the voltage $V_2$ is held to a constant value by the Zener diode 11, so that the output level of the comparator 12 decreases. The sequence controller 4 detects the change of reduction and controls the load circuit 5 and numeral indicator 13.

This control operation will then be described with reference to a flowchart shown in FIG. 5. When the copying operation is continued (step-1), the voltage of the battery is always monitored. Therefore, when the voltage decreases to a value lower than a predetermined value (step-2), the numeral indicator 13 flickers to indicate this voltage drop (step-3). The copying operation is repeatedly carried out until the residual copying quantity N becomes "0" (step-4). When N becomes "0", the copying operation stops (step-5). The flickering of the numeral indicator 13 is continued (step-6). If it is NO in step-2, namely, the voltage does not drop, the copying operation is continued until the residual copy quantity N becomes "0" (step-7). The copying operation stops when N becomes "0" (step-8).

Namely, when the voltage drop of the battery is detected, the indicator 13 flickers and the copying operation is continued until the last numeral in this state and then it is finished. However, the indication of the voltage drop continues until the main switch 3 is turned off or the voltage becomes zero. However, in this case, there is a possibility such that the copying operation stops during the copying operation due to the voltage drop.

Figure 6:
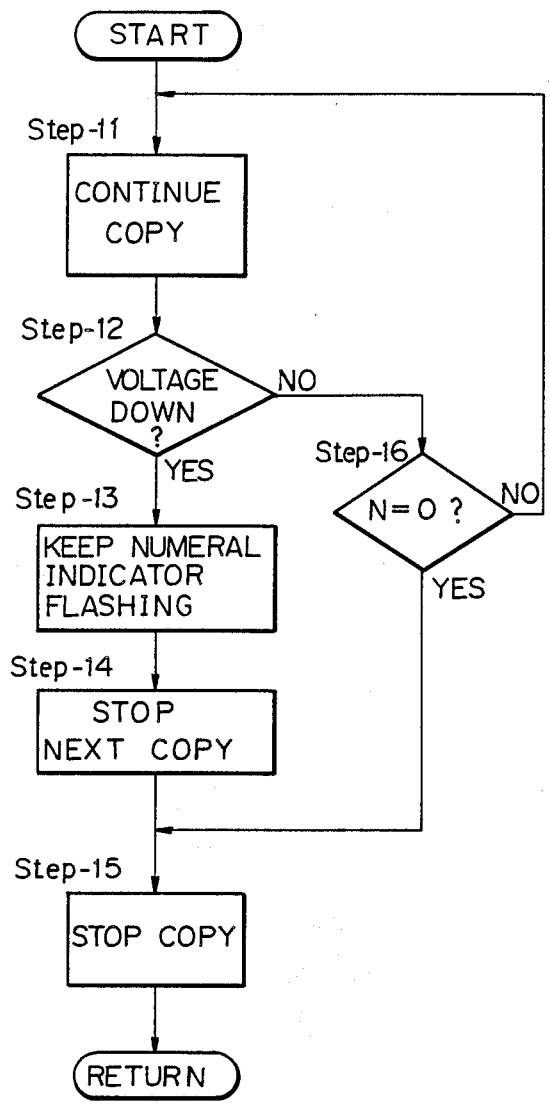

On the other hand, FIG. 6 is a flowchart showing an example of the control operation such that the indicator 13 flickers when the voltage drop occurred and the copying operation is stopped after completion of the copy at that time.

Figure 5:
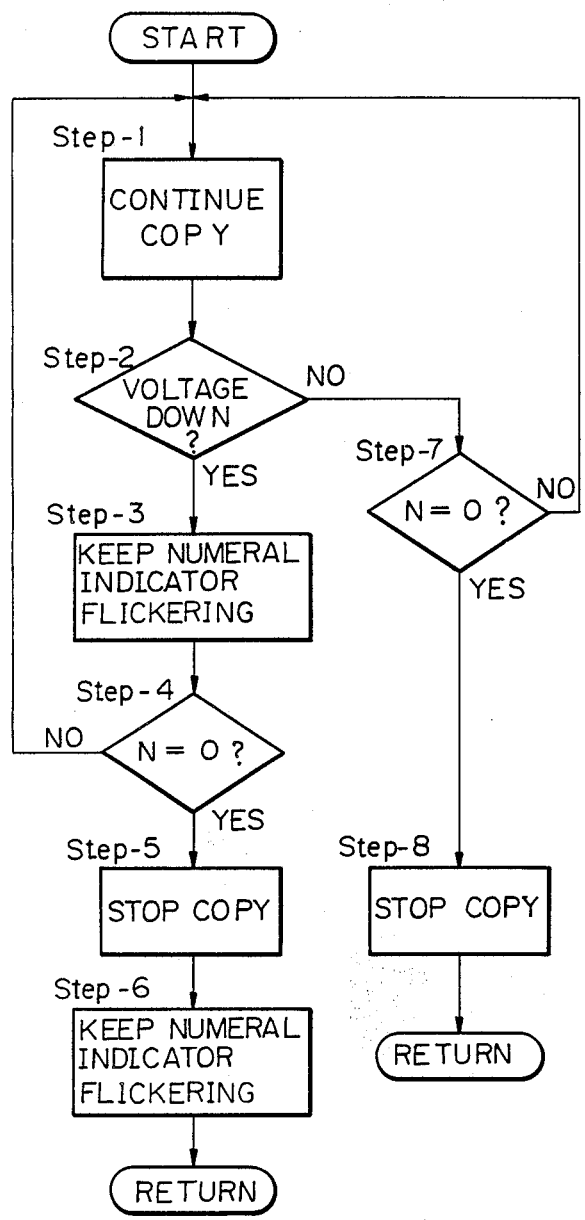
FIGS. 5 and 6 are flowcharts showing sequences of a controller.

The control operation of FIG. 6 is almost similar to that shown in FIG. 5 except the following points. Namely, in FIG. 6, the indicator 13 starts flickering (step-13) due to the detection of the voltage drop (step-12), and at the same time the copy of one paper during the copying operation at that time is continued and after completion of this copy, the next copying operation is stopped (step-14).

Namely, in both of the above two examples, the voltage drop of the battery to a value below a predeterminded value is indicated to the operator by the flickering of the numeral indicator 13.

Figure 7:
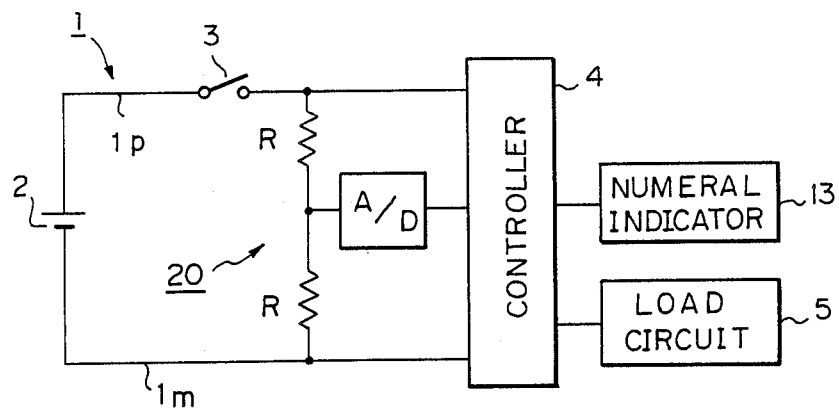
FIG. 7 is a fundamental circuit diagram of another embodiment.

As another embodiment, as shown in FIG. 7, the voltage may be directly detected by the controller 4 by arranging a voltage detecting circuit 20 using the resistors R and an A/D converter.

In the above embodiments, when the voltage of the battery drops to a value below the predetermined value, this voltage drop is always indicated to the operator. An explanation will then be made hereinbelow with respect to the case where the voltage of the battery is indicated only when it is necessary.

Figure 8:
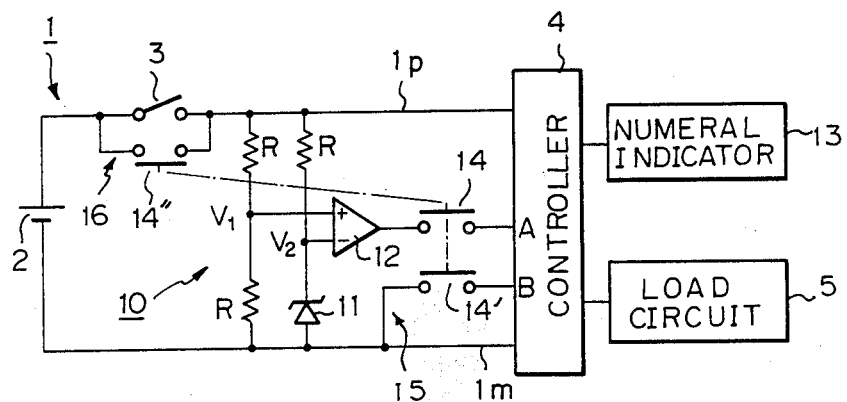
FIG. 8 is a fundamental circuit diagram of still another embodiment.

FIG. 8 shows a fundamental circuit of this embodiment, in which the same parts and elements as those shown in FIG. 4 are designated by the same reference numerals and their descriptions are omitted.

In FIG. 8, the output of the comparator 12 of the voltage detecting circuit 10 is inputted to an input port A of the controller 4 through a detection check switch 14.

Further, a control operating circuit 15 and a main switch auxiliary circuit 16 are respectively provided. The control operating circuit 15 is wired from an input port B of the controller 4 to the (−) side conducting wire 1m through a detection check switch 14'. The main switch auxiliary circuit 16 is wired in parallel with the main switch 3 and has a detection check switch 14". The switches 14' and 14" operate simultaneously with the switch 14.

Figure 9:
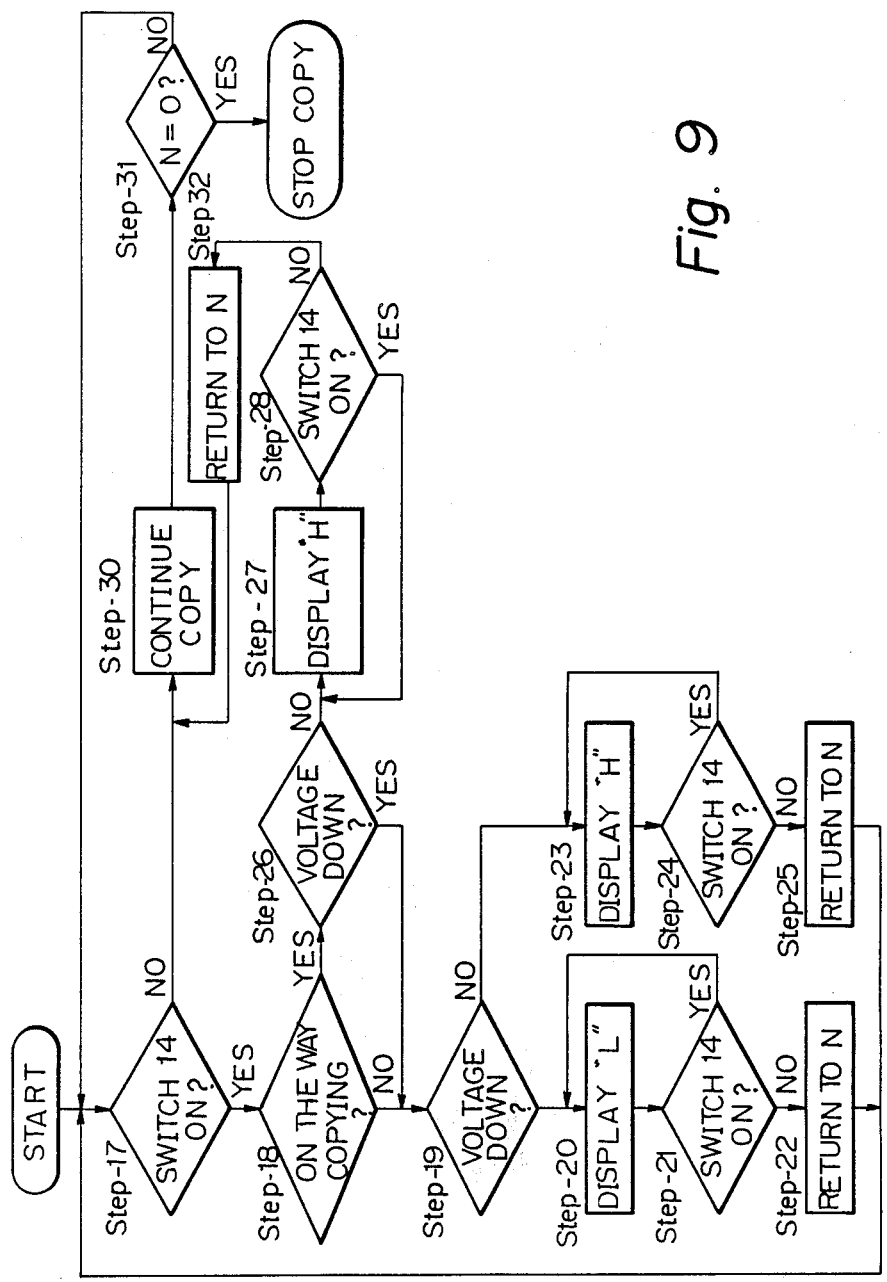
FIG. 9 is a flowchart for a sequence controller.

With this arrangement, the voltage state of the battery 2 is always monitored by the comparator 12 through the main switch 3. Namely, when the voltage of the battery 2 is sufficiently high, the voltage $V_1$ which is applied to the (+) side of the comparator 12 is higher than the voltage $V_2$ which is applied to the (−) side, so that the output of the comparator 12 is maintained at a high level. However, when the voltage of the battery 2 drops to a predetermined value, $V_1$ becomes lower than $V_2$ since the voltage $V_2$ is regulated to a constant level by the Zener diode 11, so that the output of the comparator 12 is set to a low level. The switch 14 is turned on due to this output change, so that the low-level output is inputted to the controller 4. Then, the necessary control is executed in accordance with a flowchart shown in FIG. 9.

A check is made to see if the switch 14 is ON or not (step 17) on the basis of the change of the voltage level of the input port B of the controller 4 due to the switch 14'. When the switch 14 is ON in step 17, if the copying operation is in the stop mode in step 18 and the voltage drop occurs in step 19, "L" is indicated by the numeral indicator 13 in step 20. However, in this case, unless the switch 14 is turned on by the operator (step 21), the display content of the indicator 13 is returned to a numeral N (step 22) and the processing routine is returned to step 17. If the switch 14 is ON in step 21, step 20 follows again and "L" is continuously displayed. On the other hand, unless the voltage drop occurs in step 19, "H" is displayed (step 23). At this time, if the switch 14 is OFF in step 24, the display content of the indicator 13 is returned to a numeral N in step 25 and the processing routine is returned to step 17. However, when the switch 14 is ON in step 24, step 23 follows again and "H" is continuously displayed.

If the copying operation is being executed in step 18, steps 19 and 20 follow when the voltage drop occurs in step 26. If no voltage drop occurs, "H" is displayed in step 27. At this time, if the switch 14 is ON in step 28, step 27 follows and if the switch 14 is OFF, a numeral N is indicated in step 29 and the copying operation is continued (step 30). Further, when a numeral N is "0", namely, when the residual copy quantity is "0" in step 31, the copy is stopped (step 32). Unless N is "0", the processing routine is returned to step 17. If the switch 14 is OFF in step 17, steps 30 and 31 follow.

In other words, irrespective of whether the apparatus is in the copying mode or waiting mode, when the main switch 3 is ON, the voltage of the battery always can be checked by the detection check switch 14. When the voltage of the battery 2 is sufficiently high, "H" is displayed by the indicator 13. When the voltage drops to a value below a predetermined value, "L" is displayed. In this way, the voltage state is indicated to the operator. As the display content, various numerals, alphabetic characters, or the like may be used.

Figure 10:
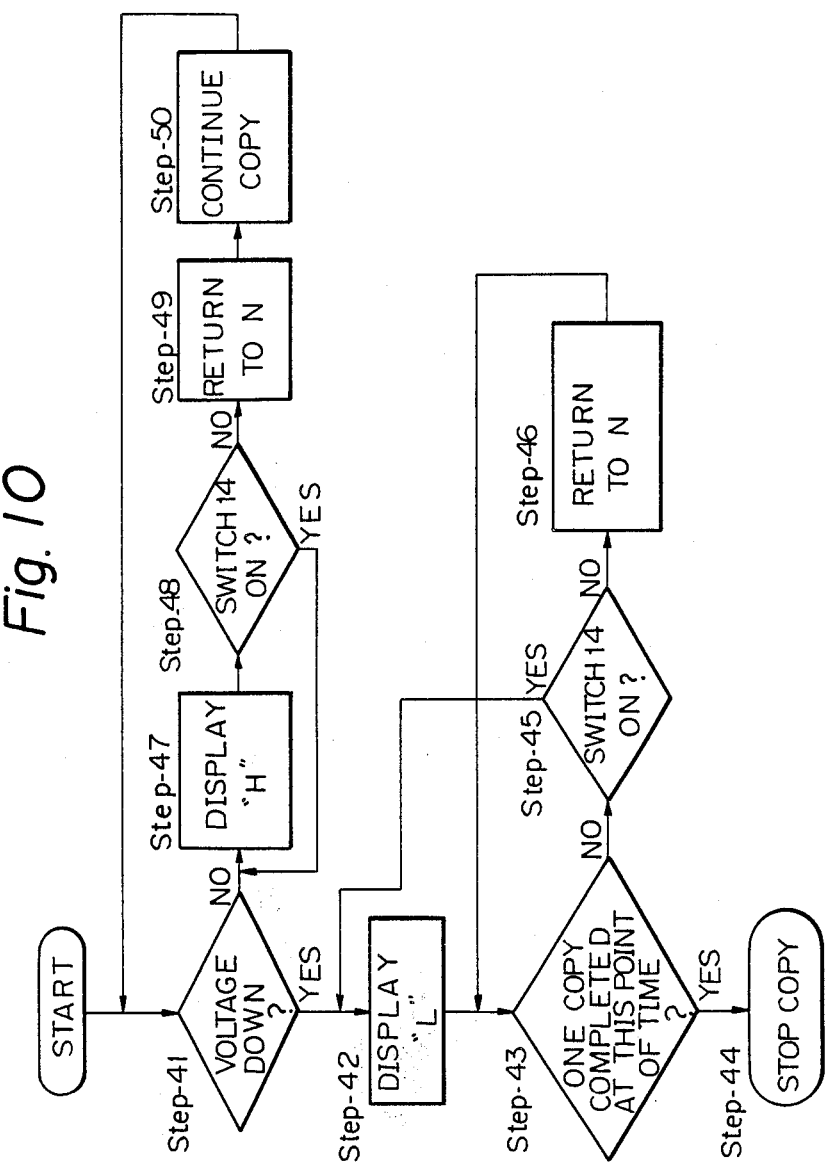
FIG. 10 is a flowchart for another embodiment.

Although the copy is executed until the residual copy quantity becomes "0" in this embodiment, when the voltage drop occurred, as shown in a flowchart of FIG. 10, after the completion of the copy at that time, the next copy may be inhibited and stopped.

Practically speaking, if the voltage has dropped in step 41, "L" is displayed by the indicator 13 (step 42). When the copy at that time has been finished in step 43, the copy is stopped in step 44. However, unless the copy at that time is completed in step 43, when the switch 14 is OFF in step 45, a numeral is again displayed in step 46 and the processing routine is returned to step 43. If the switch 14 is ON in step 45, step 42 again follows.

If the voltage drop does not occur in step 41, "H" is displayed in step 47. When the switch 14 is ON at that time in step 48, step 47 follows again. However, if the switch 14 is OFF, a numeral is displayed in step 48 and the copy is continued (step 50) and the operation from step 41 is repeated.

Further, as other examples, as shown in flowcharts of FIGS. 11 and 12, after the detection check switch 14, 14', and 14" was turned on and "H" or "L" was displayed, a numeral (residual copy quantity) N at that time is not immediately displayed but "H" or "L" also may be displayed for t seconds. Namely, even when the operator merely instantaneously depressed the check switch 14, 14', and 14" as well, "L" or "H" is displayed for t seconds and can be certainly confirmed the display content by the operator.

This control operation intends to maintain the display for a short time after the switch 14 was turned off from the ON state. FIGS. 11 and 12 show examples of flowcharts which are added to parts of the flowcharts of FIGS. 9 and 10, respectively.

The switch 14" connected in parallel with the main switch 3 monitors the voltage even when the main switch 3 is OFF, thereby making it possible to execute the control of the controller 4.

The battery driven apparatus ordinarily uses no fuse or the like. Therefore, when the load is short-circuited, an overcurrent flows and there is a risk such that the voltage of the battery is momentarily consumed. A countermeasure in such a case will then be described hereinbelow.

Figure 13:
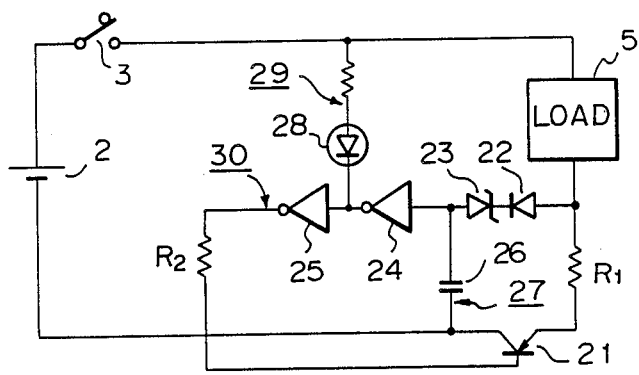
FIG. 13 is a circuit diagram showing the first embodiment of a safety circuit for a short-circuit of a load according to the invention.

FIG. 13 is a diagram showing an embodiment of safety means with respect to the short-circuit of the load.

An arrangement will be first explained. A registor $R_1$ and a (PNP type) transistor 21 are provided on the (−) side conducting wire of the battery 2 and are connected in series with the load circuit 5. The resistor $R_1$ has a low value of the order of 0.1 to a few ohms such that the ordinary operation of the copying apparatus won't be influenced. A power interruption operating circuit (hereinafter, referred to as an operating circuit) 30 is constituted by a series circuit consisting of a diode 22, a Zener diode 23 which is oppositely connected to the diode 22, inverters 24 and 25, and a resistor $R_2$. One end of the operating circuit 30, namely, one end of the resistor $R_2$ is connected to a base of the transistor 21. The operating circuit 30 is connected in parallel with the resistor $R_1$. In addition, a capacitor circuit 27 and a display circuit 29 are arranged before and after the inverter 24. The capacitor circuit 27 has a capacitor 26 and is connected to the (−) side conducting wire of the battery 2. The display circuit 29 has a resistor $R_3$ and an LED (light emitting diode) 28 and is connected to the (+) side conducting wire of the battery 2.

The operation of the circuit now will be described.

The ordinary operation is executed along the signal path consisting of the battery 2, main switch 3, and load circuit 5. However, if the load circuit 5 is once short-circuited, a current larger than the ordinary maximum value is generated and the voltage E of the battery 2 is applied across the resistor $R_1$ as will be understood from the expression of $I = E/R$. Assuming that the voltage of the Zener diode 23 at this time is $V_z$, there is the relation of $V_z < E$, so that the inverter 24 is turned on and its output decreases from a high level to a low level. Subsequently, since a low-level signal is inputted to the inverter 25, an output of the inverter 25 becomes a high level. At the same time, the LED 28 of the display circuit 29 connected to the output side of the inverter 24 emits the light and a current flows through the operating circuit 30. Thus, the PNP type transistor 21 connected to the inverter 25 is turned off, thereby disconnecting the load 5 by way of the (−) side conducting wire of the battery 2.

At this time, the capacitor 26 starts charging through the Zener diode 23 and is continued until the transistor 21 is turned off. Even if the load 5 is disconnected from the battery 2, the charges in the capacitor 26 are held. The diode 22 serves to prevent a leakage current of the capacitor 26.

Therefore, even if the main switch 3 is turned on or off in this state, the transistor 21 is maintained in the OFF state and the light emitting state of the LED 28 is also maintained, so that the operator can know that the load circuit 5 was short-circuited.

Another embodiment will then be described with reference to FIG. 14.

In this embodiment, a relay 31 is used in place of the transistor 21 of the above embodiment of FIG. 13 and the same parts and elements as those in FIG. 13 are designated by the same reference numerals. The arrangement of FIG. 14 now will be explained. An operating circuit 40 is constituted by a series circuit consisting of the relay 31, inverter 24, Zener diode 23, and diode 22. The operating circuit 40 is arranged in parallel with the load circuit 5 from the (+) side conducting wire of the battery 2 and has the capacitor circuit 27. A display circuit 32 is constituted by a series circuit consisting of the resistor $R_3$, LED 28, and a relay contact 31a. Both ends of the display circuit 32 are connected to the conducting wires on the (+) and (−) sides of the battery 2. The relay 31 makes operative the relay contact 31a and a relay contact 31b which is provided near the resistor $R_1$ of the (−) side conducting wire.

With this arrangement, when the output of the inverter 24 becomes a low level due to the short-circuit of the load circuit 5, the relay 31 operates and relay contact 31a, which is normally in the OFF state, is turned on and the LED 28 emits the light. Simultaneously, the relay contact 31b, which is normally in the ON state, is turned off and the load circuit 5 is disconnected from the battery 2.

Figure 15:
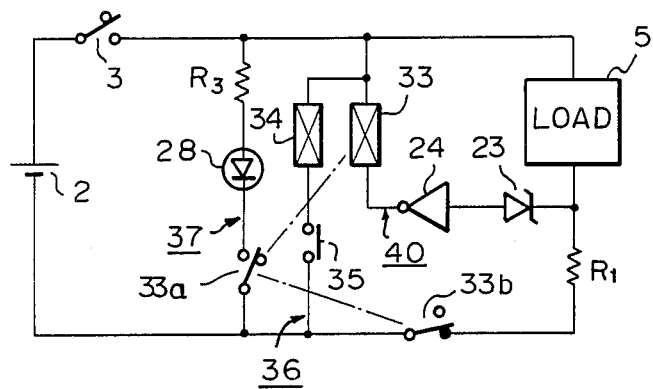

Another embodiment now will be explained with reference to FIG. 15.

Figure 14:
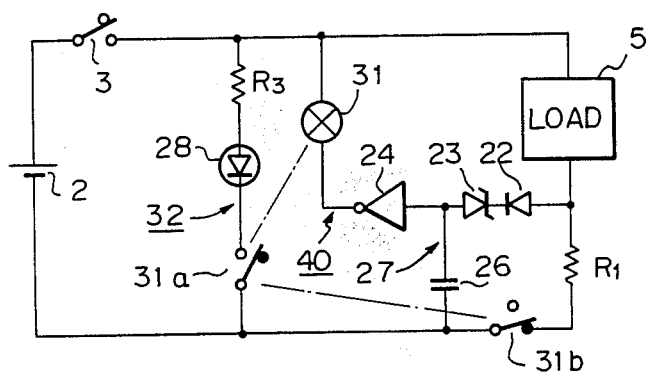
FIGS. 14, 15, 17, 18-I, and 19 are circuit diagrams showing other embodiments, respectively.

In this embodiment, a latch relay 33 is used in place of the relay 31 in the second embodiment of FIG. 14. The arrangement of FIG. 15 now will be described. The operating circuit 40 is constituted by a series circuit consisting of the latch relay 33, inverter 24, and Zener diode 23 and is provided in parallel with the load circuit 5 from the (+) side conducting wire of the battery 2. A canceling circuit 36 consisting of a series circuit of an unlocking coil 34 and a cancel button 35 in the same latch relay 33 is further provided in parallel with the operating circuit 40.

In addition, a display circuit 37 consisting of the resistor $R_3$, LED 28, and a relay contact 33a is provided in parallel with the canceling circuit 36. The latch relay 33 makes operative the relay contact 33a and a relay contact 33b which is arranged on the side of the resistor $R_1$ of the (−) side conducting wire.

Therefore, when the load circuit 5 is short-circuited, the latch relay 33 operates and the relay contact 33a is closed due to the operation which is nearly the same as that mentioned in the embodiment of FIG. 14. Thus, the LED 28 emits the light and the relay contact 33b is opened and the load 5 is disconnected from the battery 2.

To recover to the original state after the countermeasure of the short-circuit of the load was carried out, by pressing the cancel button 35 to turn on the unlocking coil 34, the latch relay 33 is turned off, so that the relay contact 33a allows the display circuit 37 to be opened and at the same time, the relay contact 33b connects the load 5 with the battery 2.

Figure 16:
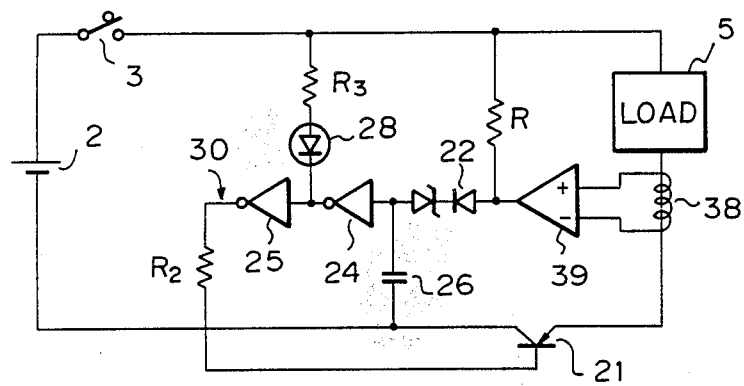
FIG. 16 is a circuit diagram showing an example when a current probe is used in the embodiment shown in FIG. 13.

Although the overcurrent which is caused due to the short-circuit of the load is detected by the resistor $R_1$ in the above examples, it is obviously possible to use a current probe (for converting a change in amount of a current to a voltage) which is generally used. Namely, FIG. 16 shows an example in the case of using the circuit of FIG. 13. In this diagram, a current detecting coil 38 is arranged on the (−) side conducting wire of the battery 2 and is connected to the diode 22 through an operational amplifier 39. The coil 38 is connected to the (+) side conducting wire of the battery 2 through the resistor R.

With this arrangement, a deviation amount of the current which is caused in the coil 38 is amplified by the operational amplifier 39 and an output of the amplifier 39 is detected by the Zener diode 23 through the diode 22.

Figure 17:
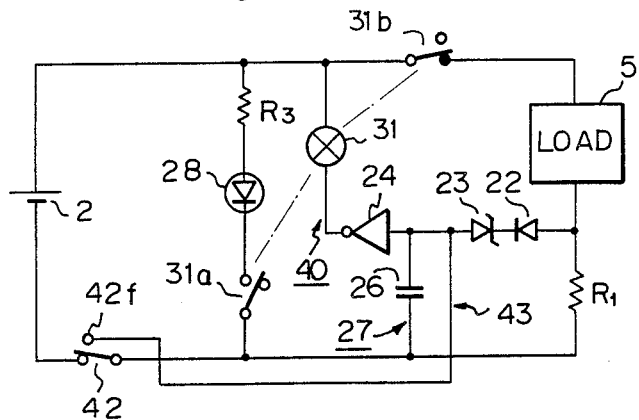

Still another embodiment now will be described with reference to FIG. 17.

This embodiment is almost similar to the circuit of FIG. 14. In FIG. 17, the capacitor 26 is discharged by a switch 42 and each circuit is reset in synchronism with the operation of the switch 42.

The switch 42 is arranged on the (−) side conducting wire of the battery 2. The other end of a discharge circuit 43 which is provided in parallel with the capacitor circuit 27 from the operating circuit 40 is connected to a terminal 42f on the OFF side of the switch 42. The relay contact 31b is arranged near the load circuit 5 of the (+) side conducting wire.

Therefore, when the switch 42 is connected to the OFF side terminal 42f, the capacitor 26 discharges and the input side of the inverter 24 becomes a low level and the output side becomes a high level and the relay 31 is turned off. Thus, the relay contact 31a is opened and the relay contact 31b is closed, respectively, so that these contacts are in their original states.

Figure 18:
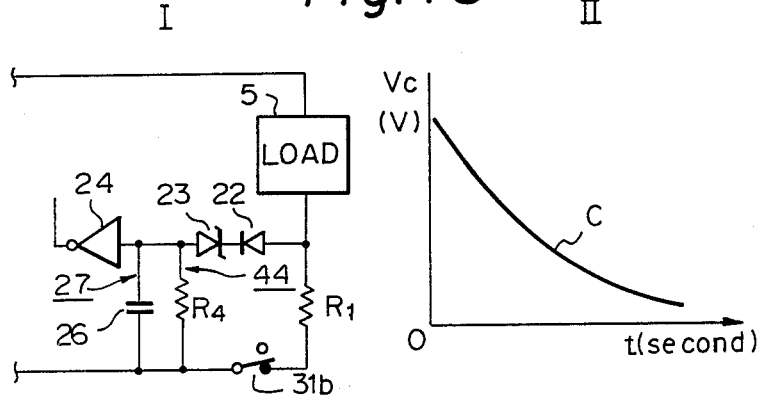

FIG. 18 shows another embodiment, in which a resistor circuit 44 having a proper resistor $R_4$ is provided in parallel with the capacitor circuit 27 in the operating circuit 40 in the circuit of FIG. 14.

Therefore, when the main switch 3 is turned off, the charges accumulated in the capacitor 26 are discharged through the resistor $R_4$ in accordance with a discharge curve C as shown in FIG. 18-II. Thus, when the level on the input side of the inverter 24 drops and reaches a predetermined level, the output of the inverter 24 is inverted and becomes a high level. The time until the inversion is determined by the expression of $T = CR$ (C: capacity, R: resistance) and may be arbitrarily set.

Figure 19:
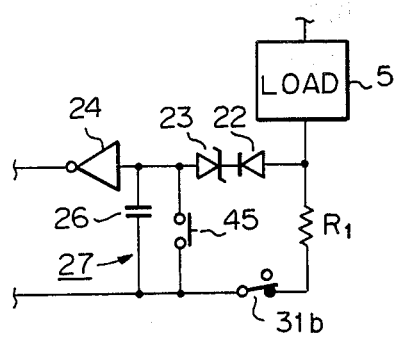

FIG. 19 shows another embodiment of FIG. 18-I. In FIG. 19, a reset button 45 is provided in place of the resistor circuit 44 in the embodiment of FIG. 18-I and the capacitor 26 is forcedly discharged due to the operation of the reset button 45.

Other various kinds of methods are considered with respect to the discharge (reset) and the invention is not limited to the above-mentioned method.

A method of charging to the battery and a current supply to the load will then be described.

Figure 20:
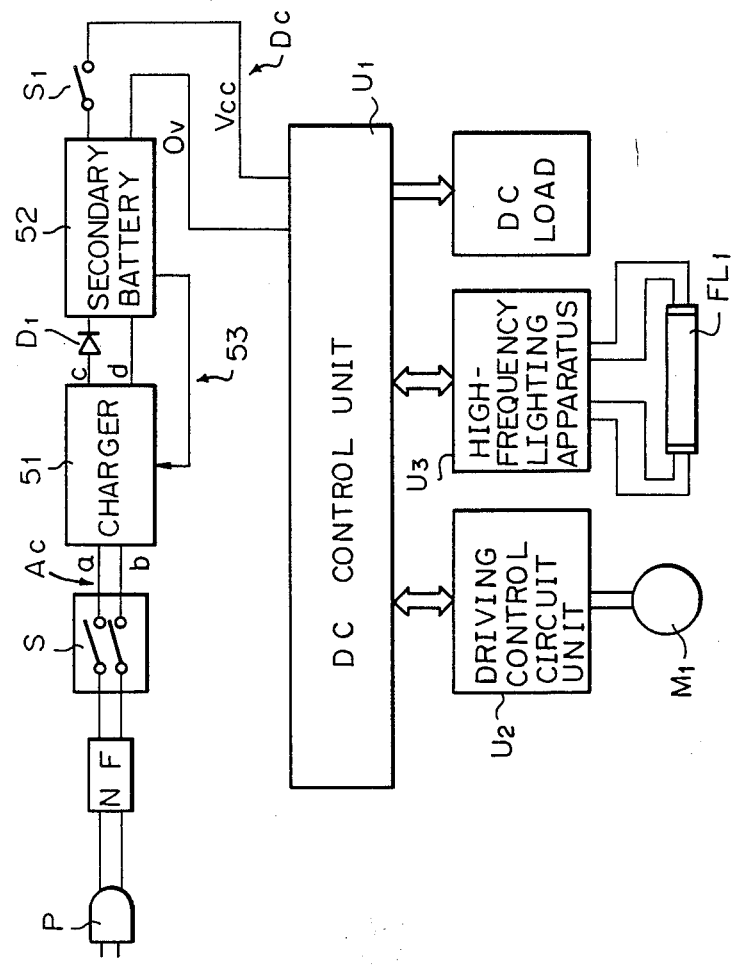
FIG. 20 is a block diagram showing an arrangement of an electrical system of an embodiment according to the present invention.

In an arrangement diagram shown in FIG. 20, P denotes a power slug to an AC power source; NF is the noise filter; S is the door switch; reference numeral 51 is a charger which is connected in series with an AC power supply circuit Ac; 52 a chargeable secondary battery; $D_1$ a diode to prevent a reverse current from the secondary battery 52 to the charger 51; 53 a conducting wire to feed back a voltage of the battery 52 to the charger 51; $D_c$ a DC power supply circuit from the secondary battery 52; and $S_1$ a main switch provided in the power supply circuit $D_c$. The main switch $S_1$ is turned on when the apparatus is used. In addition, $U_1$ denotes a DC control unit provided in series for the DC power supply circuit $D_c$; $U_2$ is a driving control circuit unit to operate a high-efficiency DC motor $M_1$; $FL_1$ is a fluorescent lamp of 18W serving as a light source to expose an original; and $U_3$ is a high-frequency lighting apparatus of the lamp $FL_1$.

A nickel-cadmium battery (hereinafter, referred to as an Ni-Cd battery) is used as the secondary battery 52. Namely, the battery 52 is constituted by twenty Ni-Cd batteries 52$k$ which are connected in series and the voltage of 24V is obtained. The battery which can be used for a large discharge and can be rapidly charged is used as the Ni-Cd battery 52$k$ serving as the chargeable storage battery.

The pressure fixing system is used as the fixing system of this copying apparatus; therefore, the fixing heater H necessary for the conventional thermal fixing system is unnecessary.

The situation of the charge sequence of the secondary battery 52 will then be explained with reference to a timing chart of FIG. 21.

Figure 21:
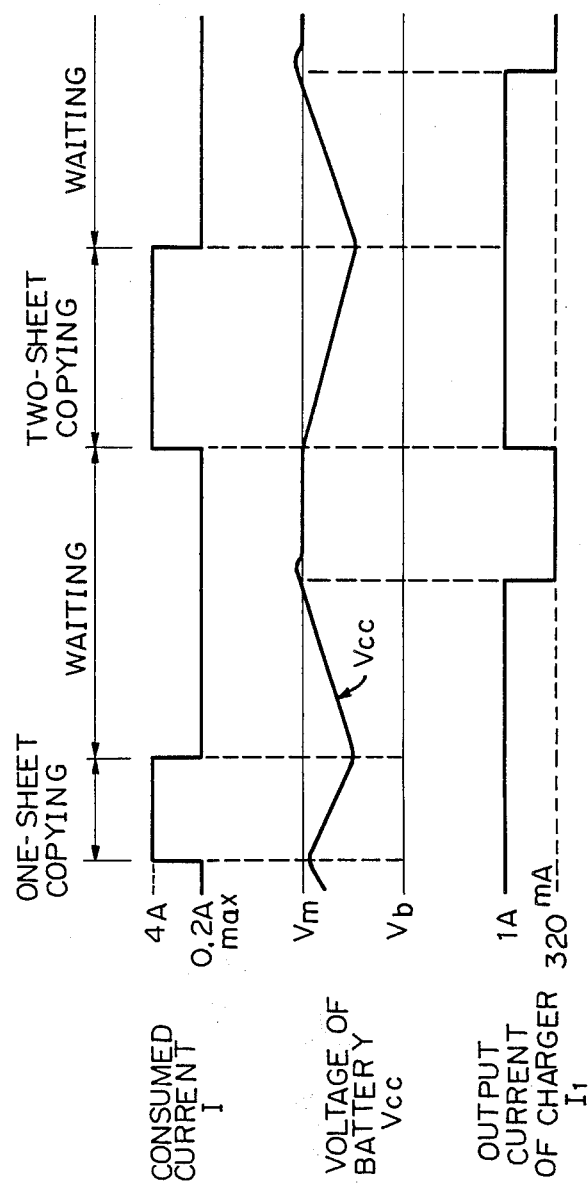
FIG. 21 is a timing chart of various kinds of currents and voltages in the electrical system of an embodiment of the invention.
Figure 22:
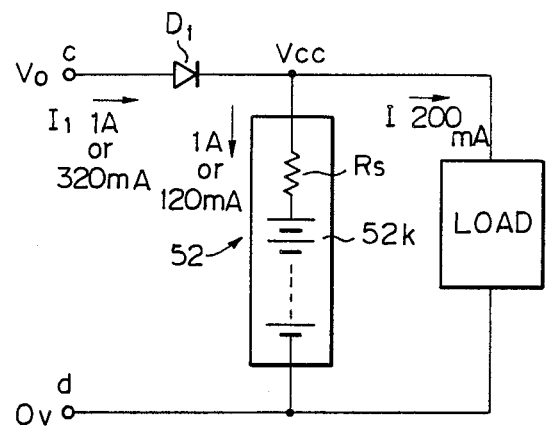
FIG. 22 is a diagram showing the relation between the current of a secondary battery and the charge current in the waiting mode.
Figure 23:
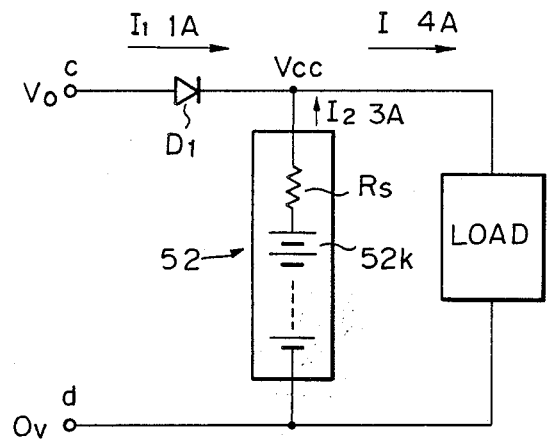
FIG. 23 is a diagram showing the relation between the current of a secondary battery and the consumed current during the copying operation.

As shown in FIG. 21, a consumed current I of the copying apparatus according to the invention is 4A at 24V during the copying operation and is up to 0.2A in the waiting mode. A charge current $I_1$ which is charged to the secondary battery 52 from the charger 51 through the diode $D_1$ for prevention of the reverse current is 1A during the copying operation and is 1A in the waiting mode until the voltage of the battery reaches a full charge voltage Vm. Thereafter, the charge current $I_1$ is 320 mA of which the current of 0.2A in the waiting mode was added to the current of 120 mA, which is 1/10 of the rated capacity of five hours of 1,200 mAh of the Ni-Cd battery 52$k$. Therefore, during the copying operation, 1A of the constant current $I_1$ from the charger 1 and 3A of a discharge current $I_2$ from the secondary battery 52 are synthesized, so that the consumed current I of 4A is supplied to the DC load. Therefore, the input current from the AC power supply can be reduced and the energy saving can be realized. FIG. 22 shows the flow of the current in the waiting mode and FIG. 23 shows the flow of the current during the copying operation.

Figure 24:
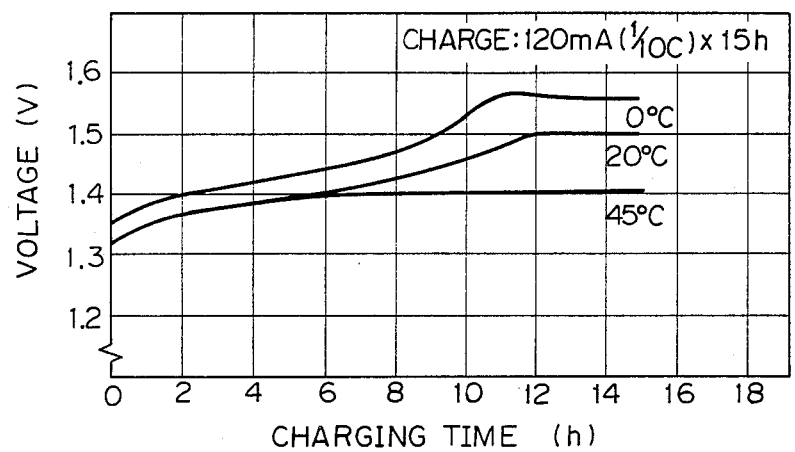
FIG. 24 is a graph showing the charge characteristic of a secondary battery which is used in the invention.
Figure 25:
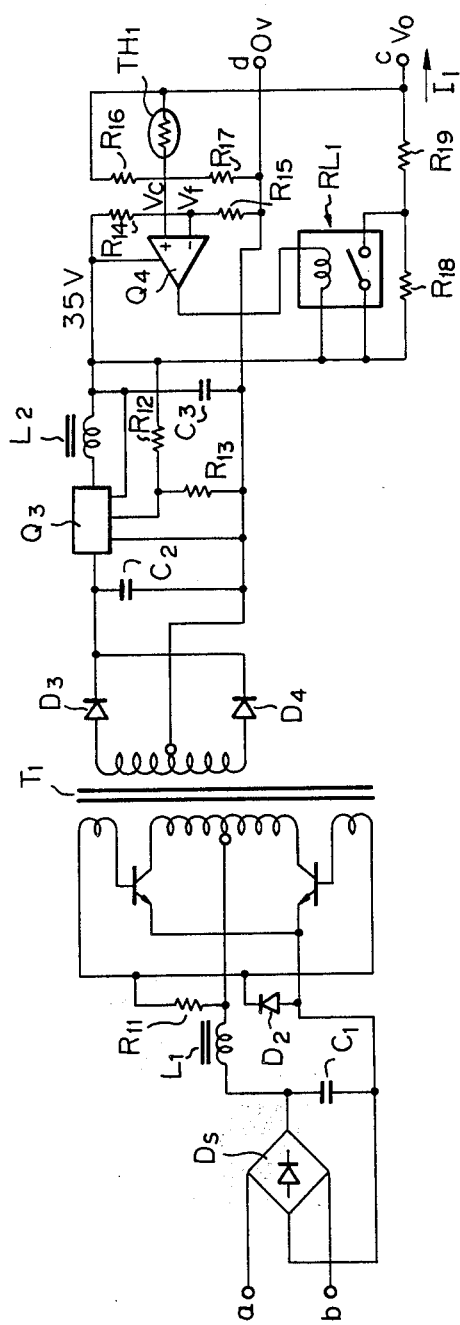
FIG. 25 is a circuit diagram showing a constitution of a charger.

On one hand, since the Ni-Cd battery 52$k$ has a feature such that the full charge voltage Vm depends on the temperature, there is a tendency such that the full charge voltage Vm decreases with an increase in temperature as shown in FIG. 24. Therefore, it is improper to set the full charge voltage Vm to a fixed value. According to the invention, the full charge voltage Vm is controlled by monitoring the ambient temperature by a thermistor $TH_1$ as shown in FIG. 25, which will be explained hereinafter.

The charger 51 will then be described with reference to FIG. 25.

The charger 51 uses a switching regulator which is more advantageous than the series regulator CR in consideration of a saving of space and a heat generation.

On the secondary side of an inverter transformer $T_1$, the power voltage is full-wave rectified and smoothed by diodes $D_3$ and $D_4$ and a capacitor $C_2$ and thereafter this power voltage is DC-DC converted by a regulator $Q_3$ consisting of an IC, so that the direct current of 35V is derived. The charge current $I_1$ is controlled to 1A when a relay $RL_1$ is ON and to 120 mA when the relay $RL_1$ is OFF as shown in FIG. 21 in dependence on the ON/OFF operations of the relay $RL_1$, respectively. The ON/OFF operations of the relay $RL_1$ are controlled by a comparator $Q_4$. A reference voltage Vf is applied to a minus (−) input of the comparator $Q_4$. A signal to monitor a voltage Vc of the battery which was divided by resistors $R_{16}$ and $R_{17}$ is inputted to a plus (+) input of the comparator $Q_4$. The thermistor $TH_1$ detects the ambient temperature and corrects the full charge voltage Vm in accordance with the temperature as mentioned above. Namely, when the ambient temperature is low, a resistance value of the thermistor $TH_1$ is large, so that an output voltage Vo of the charger when a plus input voltage Vc of the comparator $Q_4$ coincides with the reference voltage Vf is higher than that when the ambient temperature is high and the resistance value of the thermistor $TH_1$ is small. Due to this, the full charge detection voltage of the secondary battery 52 is set to a high value as the ambient temperature is low, so that the charging characteristic of the secondary battery 52 shown in FIG. 24 is satisfied. During the copying operation, even when the battery 52 is in the full charging state, a large current flows out as shown in FIG. 23, so that the voltage Vcc of the battery also decreases because of the voltage drop due to an internal resistance Rs of the battery 52 itself and the output voltage Vo of the charger 51 is also reduced. Thus, the relation of the input voltage of the comparator $Q_4$ becomes Vf>Vc and the relay $RL_1$ is certainly turned on. Therefore, the charge current $I_1$, which was 120 mA when the relay $RL_1$ is OFF, becomes 1A since a resistor $R_8$ is excluded.

In addition, according to the invention, on the assumption that a frequency in use of the copy is high and an overdischarge occurs, when the battery voltage Vcc decreases to a value below a voltage Vb of a predetermined level as shown in FIG. 21, the copying operation is stopped or inhibited for prevention of deterioration of the secondary battery 52. After the battery 52 was again fully charged, copying is permitted (the detailed circuit in this case is not shown). At this time, the voltage Vb of the predetermined level, which is the lower limit level, also has the temperature characteristic.

Another embodiment of a charging circuit, now will be described.

Figure 26:
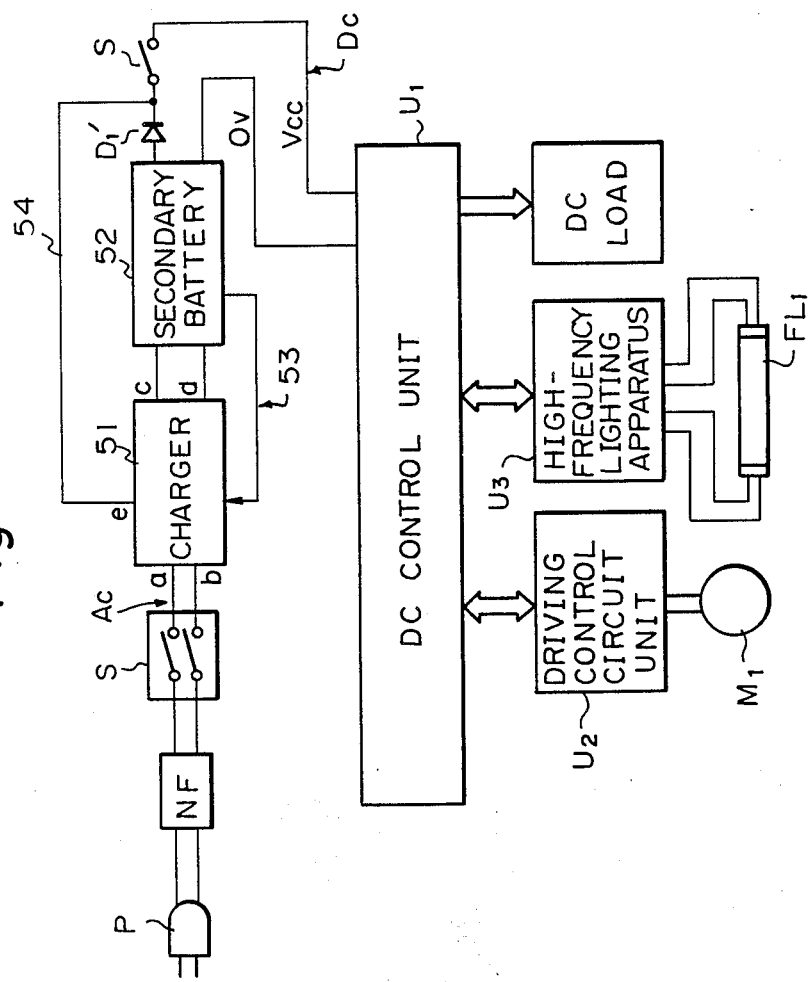
FIG. 26 is a diagram showing another embodiment of the block diagram shown in FIG. 20.

FIG. 26 is a block diagram showing an arrangement of this embodiment, which differs from FIG. 20 with respect to a point such that an output 54 is supplied from a charger 51'.

Figure 27:
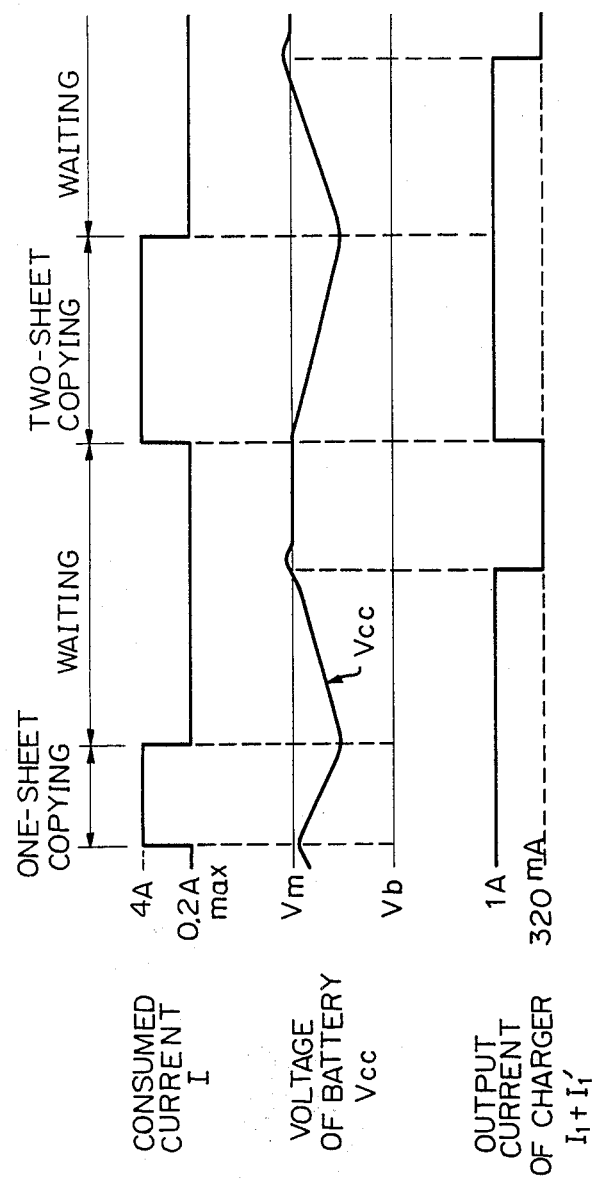
FIG. 27 is a timing chart of various kinds of currents and voltages.

A situation of a charging sequence of the secondary battery 52 will then be described on the basis of FIG. 27.

Figure 28:
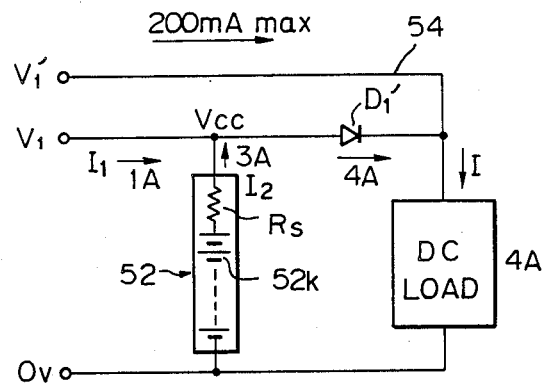
FIG. 28 is an explanatory diagram showing a current arrangement in the copying mode of the embodiment.
Figure 29:
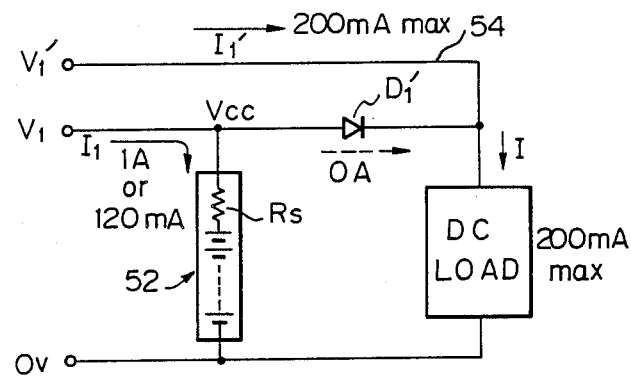
FIG. 29 is an explanatory diagram showing a current arrangement in the waiting mode of the embodiment.
Figure 31:
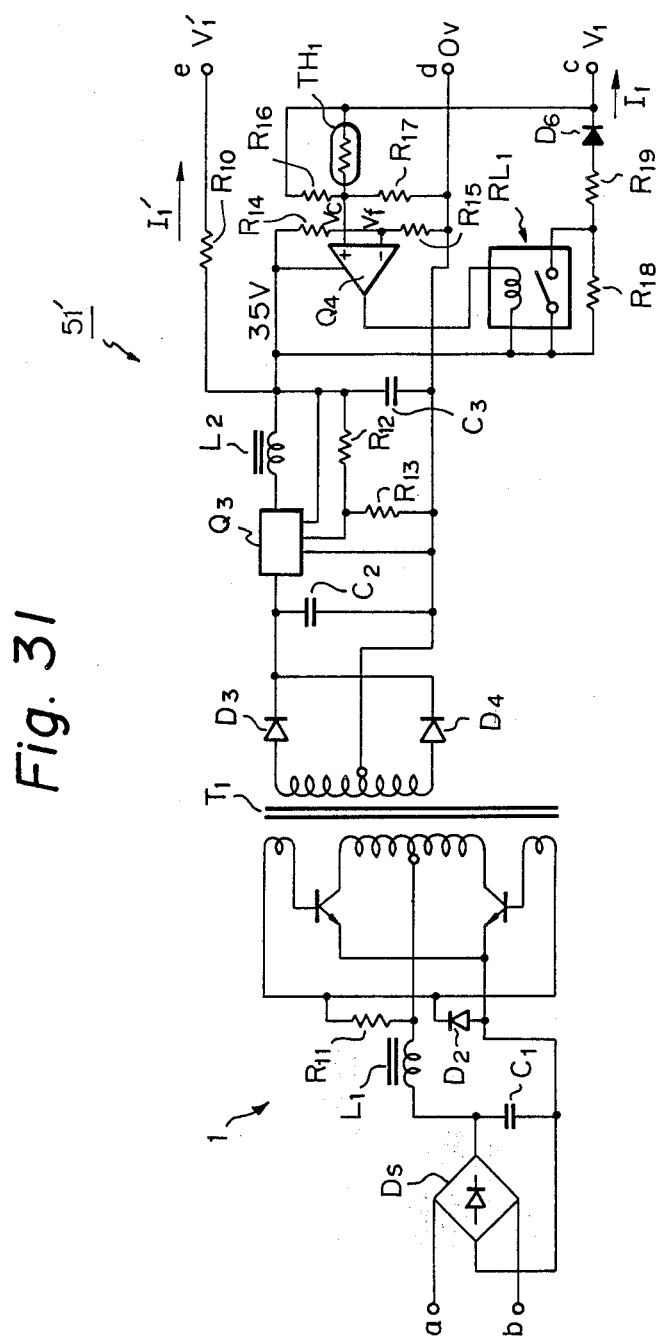
FIG. 31 is a circuit diagram showing an example of a charger to realize the invention.

The consumed current I of the copying apparatus according to the embodiment is 4A at 24V during the copying operation and is up to 0.2A in the waiting mode as shown in FIG. 27 similarly to the foregoing embodiment. The charge current $I_1$ which is charged to the secondary battery 52 from the charger 51' through a diode $D_6$ for prevention of a reverse current which is provided in the charger 51' as shown in FIG. 31 is 1A during the copying operation as shown in FIG. 28 and is 1A in the waiting mode until the battery voltage Vcc becomes the full charge voltage Vm as shown in FIG. 29. Thereafter, the charge current $I_1$ becomes 120 mA, which is 1/10 of the rated capacity of 1200 mAh (5-hour ratio) of the Ni-Cd battery 52k. At this time, the consumed current I of the DC load is supplied from another output $V_1'$ of the charger 51' through an output circuit 54 as shown in FIG. 29.

Therefore, similarly to the foregoing embodiment, during the copying operation, 1A of the constant charge current $I_1$ from the charger 51' and 3A of the discharge current $I_2$ from the secondary battery 52 are synthesized, so that the consumed current I of about 4A is supplied to the load. On the other hand, in the waiting mode, the secondary battery 52 is used only for the charge and the input current from the AC power supply can be reduced.

Figure 1:
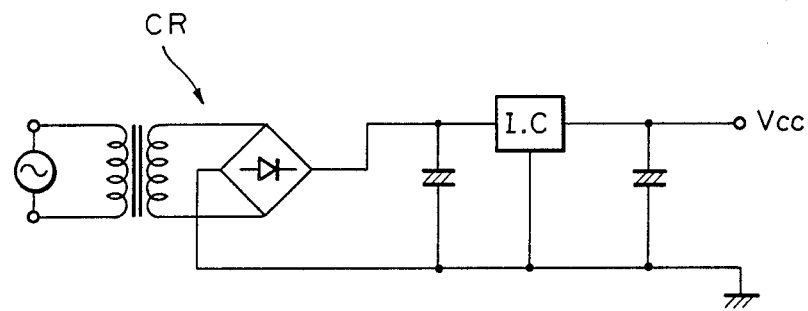
FIG. 1 is a circuit diagram of a series regulator which is used as an example of a power supply of a conventional copying apparatus.
Figure 2:
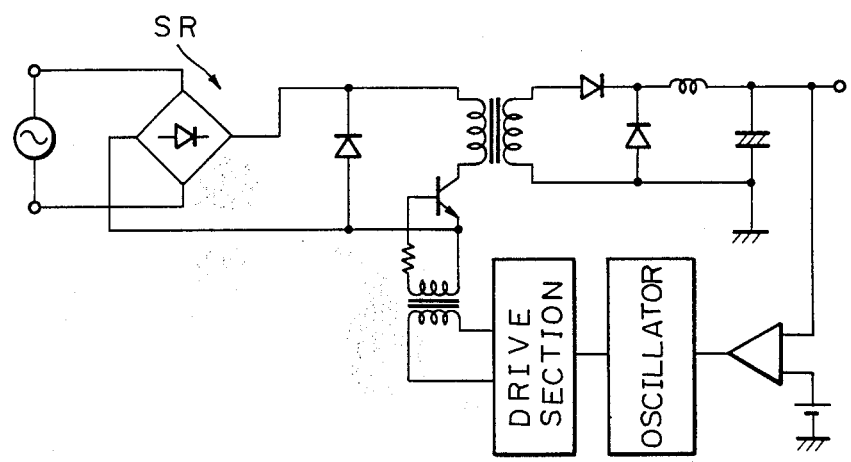
FIG. 2 is a circuit diagram of a switching regulator used as an example of a power supply of a conventional copying apparatus.
Figure 3:
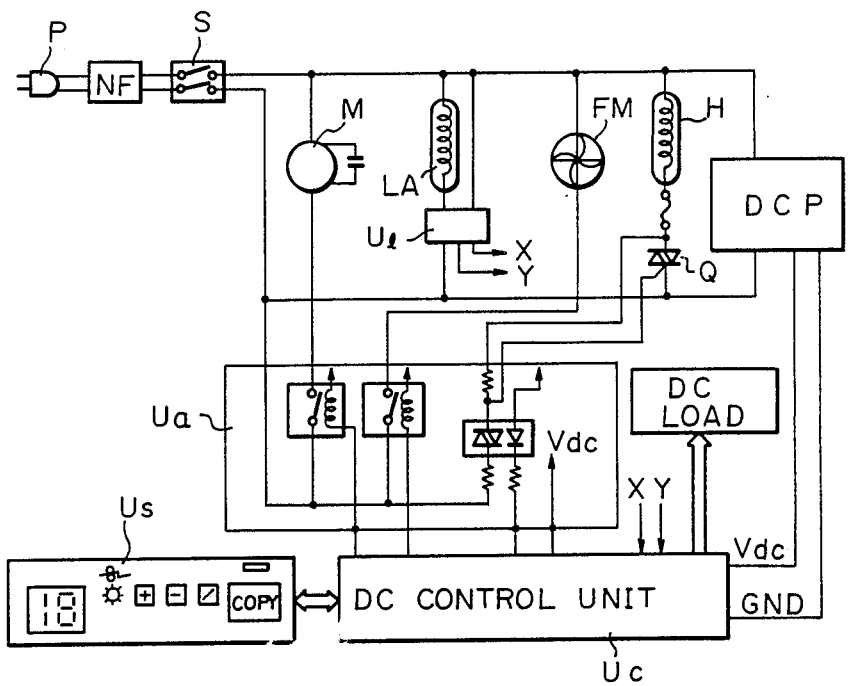
FIG. 3 is a block diagram showing an arrangement of an electrical system of a conventional copying apparatus.
Figure 30:
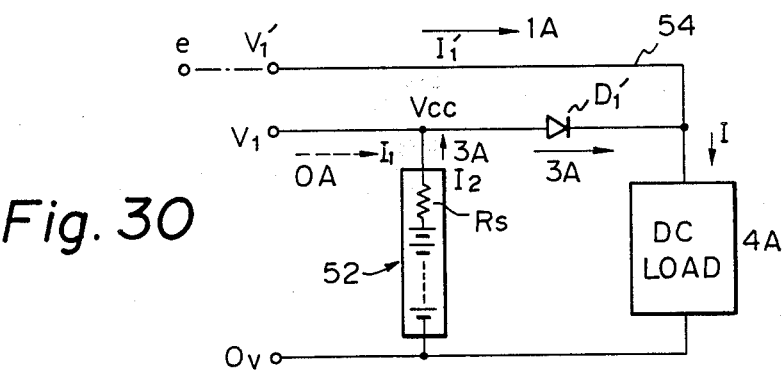
FIG. 30 is an explanatory diagram showing a current arrangement in the copying mode in a charger of another constitution.

As another constitution of the invention, as shown in FIGS. 30 and 31, 1A of the output current $I_1'$ which passes from the charger 51' through the output circuit 54 during the copying operation can be also obtained from another output $V_1'$.

FIG. 31 is a circuit diagram showing an arrangement of the charger 51' and differs from FIG. 25 with respect to a point such that a terminal e is provided.

For the output voltage $V_1'$ at the terminal e provided as another output, by properly selecting a resistor $R_{10}$, 200 mA can be obtained as the output current $I_1'$.

Figure 32:
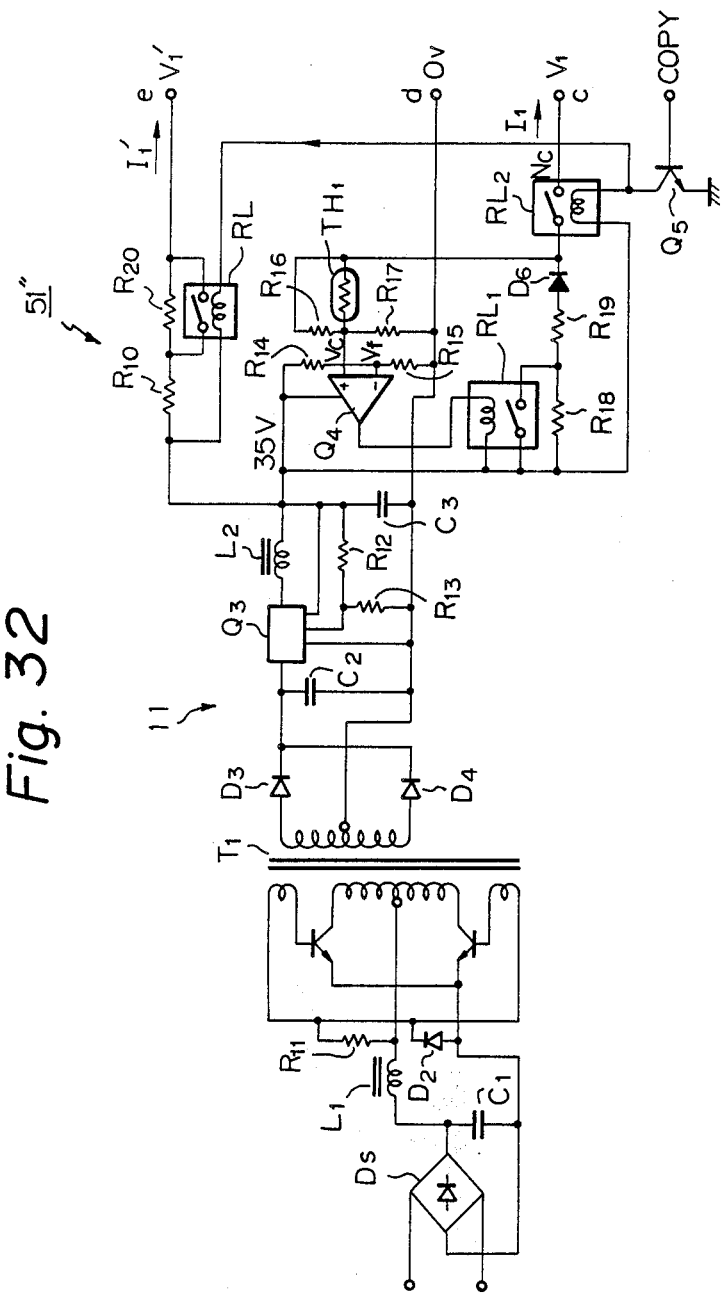
FIG. 32 is a circuit diagram showing another example of a charger having another constitution to realize the invention.

FIG. 32 shows another example of a charger 51" having another arrangement according to the invention.

During the copying operation, since a transistor $Q_5$ is turned on, a normally closed terminal Nc of a relay $RL_2$ is turned OFF, so that the charge to the secondary battery 52 is disconnected. On the other hand, a relay $RL_3$ is contrarily turned on and an output current $I_1'$ of 1A is supplied to the load from the output terminal e through the resistor $R_{10}$ as shown in FIG. 30.

In the waiting mode, the relay $RL_2$ is turned on and the relay $RL_3$ is turned off and, as shown in FIG. 29, the current $I_1'$ of up to 200 mA is supplied from the output terminal e through the resistor $R_{10}$ and $R_{20}$. The charge current $I_1$ according to the voltage of the battery is supplied from an output terminal c and is charged to the secondary battery 52.

The present invention is not limited to the foregoing embodiments but many modifications and variations are possible within the spirit and scope of the appended claims of the invention.

What is claimed is:

1. An an image forming apparatus comprising:
   image forming means;
   DC control means for controlling said image forming means;
   a battery for supplying electric power to said image forming means and to said DC control means;
   input means for inputting AC power; and
   DC power supply, for converting the AC power inputted by said input means into DC power and for supplying the DC power to said image forming means and to said DC control means;
   wherein at least one of said battery and said DC power supply enables said image forming means and said DC control means to operate.

2. An image forming apparatus according to claim 1, wherein said battery is a storage battery which can be repeatedly charged.

3. An image forming apparatus according to claim 1, wherein a power supply state from said battery to said image forming means is controlled in accordance with the presence or absence of AC power inputted to said input means.

4. An image forming apparatus according to claim 1, wherein said image forming means comprises an AC load and a DC load.

5. An image forming apparatus according to claim 4, wherein said AC load comprises a fluorescent light.

6. An image forming apparatus according to claim 4, wherein said DC load comprises a motor.

7. An image forming apparatus according to claim 1, wherein said image forming means comprises image fixing means.

8. An image forming apparatus according to claim 7, wherein said image fixing means performs pressure fixing.

9. An image forming apparatus comprising:
   image forming means;
   a battery for supplying an electric power to said image forming means;
   first detecting means for detecting a voltage of said battery;
   second detecting means for detecting whether or not the voltage supplied by said battery is equal to or greater than a reference voltage which is able to properly operate said image forming means, wherein said second detecting means includes a comparing means for comparing the supplied voltage with the reference voltage; and
   control means for prohibiting an operation of said image forming means in the event that said second detecting means detects that the supplied voltage has dropped to a value below the reference voltage;
   wherein when said second detecting means detects that the supplied voltage is at a value below the reference voltage, said control means prohibits the operation of said image forming means after at least the completion of an image forming operation occurring at that time.

10. An image forming apparatus according to claim 9, further comprising display means for indicating that the supplied voltage from said battery dropped to a value below said reference voltage.

11. An image forming apparatus according to claim 10, wherein said display means is a display device with respect to the number of times of the image formation.

12. An image forming apparatus according to claim 10, further comprising switch means for making said display means operative at an arbitrary time.

13. An image forming apparatus according to claim 10, further comprising setting means for setting the number of sheets for image forming, wherein said control means prohibits the operation of said image forming means after an image forming operation has been performed as many times as the number set by said setting means.

14. An image forming apparatus according to claim 10, further comprising setting means for setting the number of sheets for image forming, wherein said control means prohibits the operation of said image forming means regardless of teh number set by said setting means after an image forming operation at the time a detecting operation has been completed.

15. An image forming apparatus according to claim 12, further comprising a main switch for controlling a power supply to said apparatus, wherein said switch means is enabled regardless of a state of said main switch.

16. An image forming apparatus comprising:
   image forming means;

a battery for supplying an electric power to said image forming means;

means for detecting an abnormality of a power supply to said image forming means, wherein said detecting means detects a current which is supplied to said image forming means and determines that an abnormality has occurred when said supply current is above a predetermined value; and means for disconnecting said battery from said image forming means when said detecting means detects said abnormality.

17. An image forming apparatus according to claim 16, further comprising means which, when the abnormality was detected, informs this fact.

18. An image forming apparatus according to claim 16, further comprising means which, when the abnormality is recovered, cancels the disconnection of said battery from said image forming means.

19. An image forming apparatus according to claim 16, wherein said detecting means detects the fact that a short-circuit has occurred in said image forming means.

20. An image forming apparatus according to claim 18, wherein said cancel means includes a main switch for controlling a power supply to said apparatus.

21. An image forming apparatus comprising:
image forming means;
a battery for supplying an electric power to said image forming means;
a DC power supply which is derived by rectifying an alternating current; and
control means for supplying a synthetic current of a discharge current from said battery and a current which is supplied from said DC power supply to said image forming means when the alternating current is used.

22. An image forming apparatus according to claim 21, wherein during the operation of said image forming means, said synthetic current from said battery and said DC power supply is supplied to said image forming means, and when said image forming means is in the inoperative state, only the current from said DC power supply is supplied to said image forming means.

23. An image forming apparatus according to claim 22, wherein said battery is a chargeable storage battery and is charged by the current from said DC power supply when said image forming means is in the inoperative state.

24. An image forming apparatus comprising:
image forming means;
a chargeable battery for supplying an electric power to said image forming means;
a DC power supply provides DC power which is obtained by rectifying an alternating current;
charging means for charging said battery by means of said DC power supply, wherein said charging means charges said battery during both the operation and non-operation of said image forming means; and
control means for making the charge current to said battery differ in the operative state and the inoperative state of said image forming means.

25. An image forming apparatus according to claim 24, wherein said control means makes the charge current during the operation of said image forming means less than that during the non-operation of said image forming means.

26. An image forming apparatus according to claim 25, wherein said control means makes a charge current to said battery differ in accordance with a charge state of said battery when said image forming means is in the inoperative state.

27. An image forming apparatus according to claim 24, further comprising detecting means for detecting an ambient temperature of said battery, wherein said control means controls, in response to the ambient temperature detected by said detecting means, a reference voltage used for detecting the fact that said battery has been fully charged.

28. An image forming apparatus according to claim 27, wherein said detecting means includes an element which changes its resistivity as a function of its temperature.

29. An image forming apparatus comprising:
image forming means;
a chargeable battery for supplying an electric power to said image forming means;
a DC power supply provides DC power which is obtained by rectifying an alternating current for supplying a charge current to said battery;
means for detecting an ambient temperature of said battery; and
control means for controlling a reference voltage used for detecting that said battery has been fully charged, wherein said control means makes the reference voltage low when the ambient temperature is high and makes the reference voltage high when the ambient temperature is low.

30. An image forming apparatus according to claim 29, wherein said detecting means includes an element which changes its resistivity in response to its temperature.

* * * * *

UNITED STATES PATENT AND TRADEMARK OFFICE
CERTIFICATE OF CORRECTION

PATENT NO. : 4,771,312
DATED : September 13, 1988
INVENTOR(S) : MASAO YANASE, ET AL.

Page 1 of 2

It is certified that error appears in the above-identified patent and that said Letters Patent is hereby corrected as shown below:

AT [56] IN REFERENCES CITED

U.S. Patent Documents, "4,504,134" should read --4,504,139--.

COLUMN 1

Line 18, "a" (second occurrence) --the--.
Line 19, "the" should read --a--.

COLUMN 2

Line 9, "provide," should read --provide--.

COLUMN 6

Line 17, "battery driven" should read --battery-driven--.
Line 31, "won't" should read --will not--.

COLUMN 7

Line 15, "numerals. The" should read --numerals. ¶ The--.

COLUMN 8

Line 64, "slug" should read --plug--.

COLUMN 9

Line 42, "charger 1" should read --charger 51--.

UNITED STATES PATENT AND TRADEMARK OFFICE
CERTIFICATE OF CORRECTION

PATENT NO. : 4,771,312
DATED : September 13, 1988
INVENTOR(S) : MASAO YANASE, ET AL.

It is certified that error appears in the above-identified patent and that said Letters Patent is hereby corrected as shown below:

COLUMN 10

Line 35, "$R_8$" should read --$R_{18}$--.
    Line 47, "circuit," should read --circuit--.

COLUMN 11

Line 37, "resistor" should read --resistors--.
    Line 47, "An an" should read --An--.

COLUMN 12

Line 59, "teh" should read --the--.

COLUMN 13

Line 14, "was" should read --is--.
    Line 14, "informs" should read --indicates--.

Signed and Sealed this

Twentieth Day of June, 1989

Attest:

DONALD J. QUIGG

Attesting Officer

Commissioner of Patents and Trademarks